(12) United States Patent
Shao

(10) Patent No.: US 7,102,307 B2
(45) Date of Patent: Sep. 5, 2006

(54) CIRCUIT AND METHOD FOR IMPROVED BACK ELECTROMOTIVE FORCE DETECTION

(75) Inventor: Jianwen Shao, Rolling Meadows, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/608,273

(22) Filed: Jun. 27, 2003

(65) Prior Publication Data

US 2004/0000885 A1    Jan. 1, 2004

Related U.S. Application Data

(63) Continuation-in-part of application No. 09/991,325, filed on Nov. 20, 2001, now Pat. No. 6,633,145.

(51) Int. Cl.
*H02K 23/00*    (2006.01)

(52) U.S. Cl. ............... 318/254; 318/138; 318/439; 318/599; 318/727

(58) Field of Classification Search ............... 318/254, 318/138, 439, 599, 727, 771, 798, 812, 459, 318/504, 530, 531; 310/68; 388/800, 928.1
See application file for complete search history.

(56) References Cited

U.S. PATENT DOCUMENTS 5,675,656 A * 10/1997 Sondermeyer et al. ........ 381/61
6,218,750 B1 * 4/2001 Nakagawa ............... 310/68 B

* cited by examiner

*Primary Examiner*—Karen Masih
(74) *Attorney, Agent, or Firm*—Lisa K. Jorgenson; Bryan A. Santarelli

(57) ABSTRACT

A circuit and method provide a back EMF signal that represents a back EMF voltage induced in a coil of a brushless motor. In one embodiment of the invention, the circuit includes an input node operable to receive a tap voltage from the coil, and a network coupled to the input node and operable to generate the back EMF signal by removing a predetermined offset voltage from the tap voltage. Such a circuit provides a signal that more accurately indicates a zero crossing than existing circuits for controlling a sensorless brushless motor.

19 Claims, 7 Drawing Sheets

CIRCUIT AND METHOD FOR IMPROVED BACK ELECTROMOTIVE FORCE DETECTION

PRIORITY

This application is a continuation-in-part of and claims priority from United States patent application entitled CIRCUIT FOR IMPROVED BACK EMF DETECTION filed on Nov. 20, 2001, under Ser. No. 09/991,325, now U.S. Pat. No. 6,633,145 which application is incorporated by reference for all purposes.

TECHNICAL FIELD

The present invention relates generally to motor driving and control circuitry, and is more specifically related to an improved circuit and method for back electromotive force (back EMF) detection in a brushless motor.

DISCUSSION OF RELATED ART

Three-phase brushless DC motors have many uses, among which include both high-speed and low-speed applications. Conventional high-speed applications include spindle motors for computer hard disk drivers, digital video disk (DVD) drivers, CD players, tape-drives for video recorders, and blowers for vacuum cleaners. A motor for high-speed applications typically operates in a range from a few thousand rotations per minute (rpm's) to 20,000 rpm's, for example. Conventional low-speed applications include motors for farm and construction equipment, HVAC compressors, and fuel pumps. Motors for low-speed applications typically operate in a range from less than a few hundred rpm's to a few thousand rpm's, for example. Compared to DC motors employing brushes, brushless DC motors enjoy reduced noise generation and improved reliability because no brushes need to be replaced due to wear.

FIG. 1 is a cross-section of a typical conventional brushless DC motor 10. The motor 10 includes a permanent magnet rotor 12 and a stator 14 having a number of windings (A, B, C shown in FIG. 2). The windings are each formed in a plurality of slots 18. Although the rotor 12 is shown housed within the stator 14, the stator 14 may also be housed within the rotor 12. The rotor 12 is permanently magnetized, and turns to align its own magnetic flux with the flux generated by the windings.

Power to the motor 10 is often provided in a pulse width modulation (PWM) mode. The PWM mode is a nonlinear mode of power supply in which the power is switched on and off at a very high frequency in comparison to the angular velocity of the rotor. For example, typical switching frequencies may be in the range of 20 kHz. In a typical on-off cycle lasting about 50 µS, there may be 40 µS of "on" time followed by 10 µS of "off" time. Given the short duration of off times, current still flows through the motor windings so there is virtually no measurable slow down in the angular velocity of the rotor 12 during these periods. Accordingly, PWM mode provides a significant power savings advantage over modes in which power is continuously supplied.

In order to operate the motor 10, the flux existing in the stator 14 is controlled to be slightly in advance of the rotor 12, thereby continually pulling the rotor forward. Alternatively, the flux in the stator 14 may be controlled to be just behind the rotor 12, in which case the polarity is set such as to continually repel the rotor 12 forward. Therefore, to optimize the efficiency of the motor 10, it is advantageous to monitor the position of the rotor 12 so that the flux in the stator 14 may be appropriately controlled and switched from one commutation stage to the next in the commutation sequence. If the rotor 12 movement and the flux rotation should ever get out of synchronization, the rotor 12 may become less efficient, start to jitter, or stop turning.

A conventional motor can be represented in circuit form as having three coils A, B, and C connected in a "Wye" or "Y" configuration, as shown by reference numeral 20 in FIG. 2, although a larger number of stator coils are often employed with multiple rotor poles. Typically, in such applications, eight-pole motors are used having twelve stator windings and four N-S magnetic sets on the rotor, resulting in four electrical cycles per revolution of the rotor. The stator coils, however, can be analyzed in terms of three "Y" connected coils, connected in four sets of three coils, each physically separated by 90 degrees.

In operation, coils A, B and C are energized with a PWM drive signal that causes the coils to generate magnetic fields. The resulting attraction/repulsion between the magnetic fields of the coils A, B, and C and the magnetic fields created by the magnets in the motor causes the rotor 12 to rotate.

The coils are energized in sequences to produce a current path through two coils of the "Y", with the third coil left floating (or in tri-state), hereinafter floating coil FC. The sequences are arranged so that as the current paths are changed, or commutated, one of the coils of the current path is switched to float, and the previously floating coil is switched into the current path. The sequences are defined such that when the floating coil is switched into the current path, the direction of the current in the coil that was included in the prior current path is not changed. In this manner, six commutation sequences, or phases, are defined for each electrical cycle in a three phase-motor, as shown in Table A.

TABLE A

| Phase | Current Flows From: | Current Flows To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

When the motor is turning, rotation of the rotor induces a back electromotive force EMF voltage e in each of the coils or windings of the motor. Such back EMF is represented by the Bemf voltage sources in FIG. 2. With respect to whichever phase is currently floating, the back EMF voltage e in that phase is monitored to determine when to advance the communication sequence. More particularly, the back EMF voltage e in the floating coil is monitored to determine when it crosses zero, at which point the position of the rotor is assumed to be known. The point at which the back EMF voltage e crosses zero is referred to as the "zero crossing." Each time a zero crossing is detected, the motor advances in its commutation sequence by 30 electrical degrees (by one phase of Table A).

A conventional technique to measure the back EMF voltage e is to measure, during a floating period, the voltage at a coil tap Va, Vb, and Vc, for the floating coil. The measured voltage at the coil tap is presumed to be the back EMF voltage e. Accordingly, the coil-tap voltage for the floating coil is monitored to detect zero crossings at which times the commutation sequence is advanced. However, unless the center tap voltage $V_{CT}$ is zero, this back EMF measurement is not fully accurate.

Known methods of detecting back EMF voltage e include comparing the floating-phase coil-tap voltage with the center tap voltage, or a virtual center tap voltage configured by a resistor network. During the PWM-on and PWM-off states, the center tap voltage $V_{CT}$ is significantly deviated from zero. This generates high common-mode noise. To offset the center tap voltage $V_{CT}$ for zero-crossing detection, voltage divider and filter circuits have been used. However, such voltage divider and filter circuits reduce the sensitivity of the circuits and delay zero-crossing detection.

SUMMARY OF THE INVENTION

In one embodiment of the invention, a circuit and a method provide a back EMF signal that represents a back EMF voltage induced in a coil of a brushless motor. The circuit includes an input node operable to receive a tap voltage from the coil, and a network coupled to the input node and operable to generate the back EMF signal by removing a predetermined offset voltage from the tap voltage. Such a circuit provides a signal that more accurately indicates a zero crossing than existing circuits for controlling a sensorless brushless motor.

DETAILED DESCRIPTION

Embodiments of the present invention will now be described with reference to the drawings, wherein like reference labels are used to refer to like elements throughout.

Figure 1:
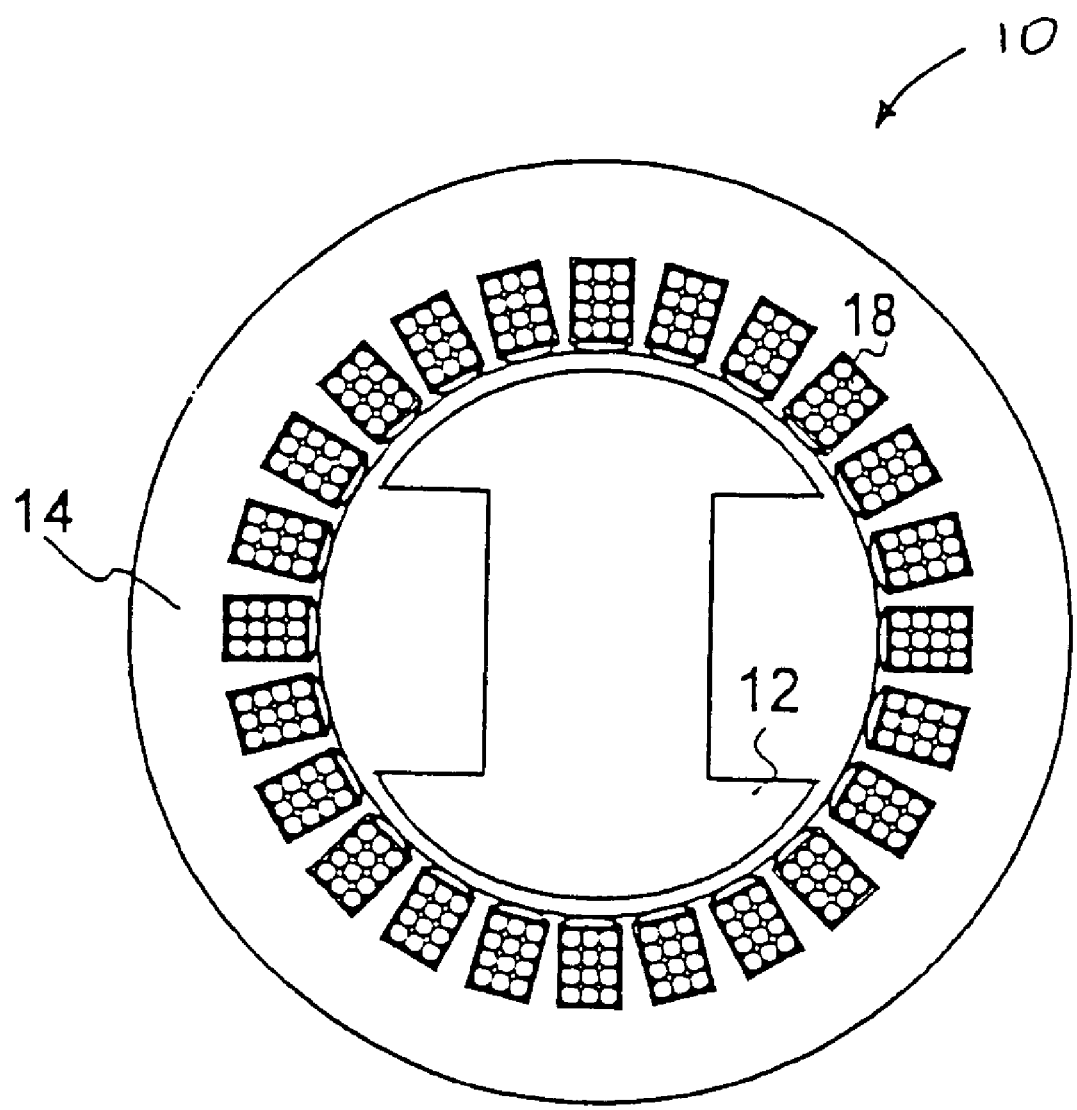
FIG. 1 shows a cross section of a known brushless, permanent magnet motor.
Figure 2:
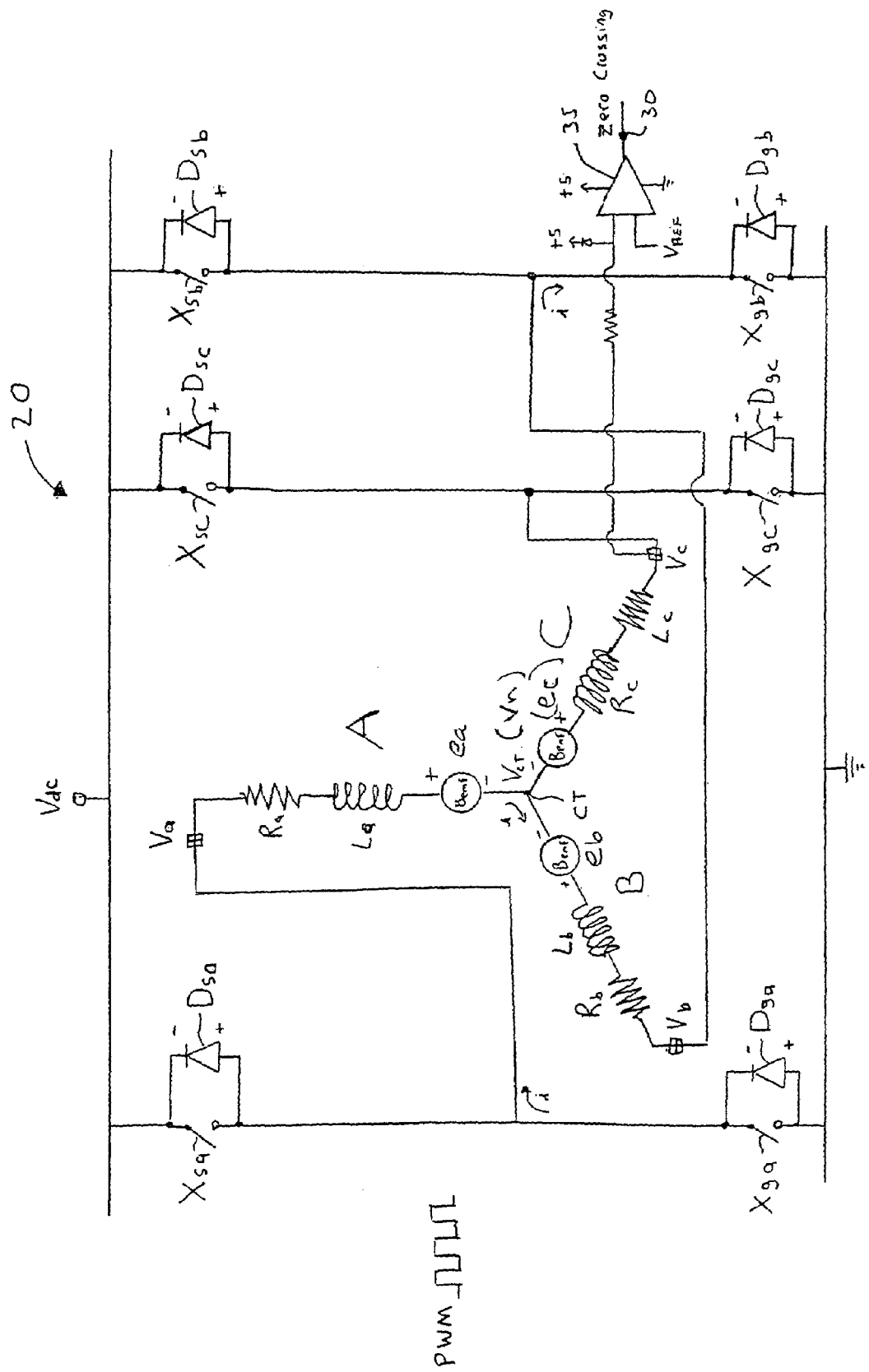
FIG. 2 shows a schematic diagram of a known circuit for controlling the motor of FIG. 1.

Referring initially to FIG. 2, there is shown an electrical schematic diagram of a conventional motor 20 having three coils A, B, and C connected in a "Y" configuration. As will be described in more detail below, embodiments of the present invention provide an improved method and apparatus for advancing the commutation sequences of the motor 20 by monitoring for zero crossings during PWM-off states. During such PWM-off states, a precondition circuit 50, (FIG. 4) is used to offset variances in back EMF voltage e as measured at a coil tap, which occur due to a non-zero center tap voltage $V_{CT}$. While the precondition circuit 50 is useful in any brushless DC motor application, it finds particular benefit in low-speed and/or low-voltage motor applications as discussed in more detail below.

The motor 20 comprises three windings or coils A, B, C. Each winding has a respective inductor La, Lb, Lc and line resistance Ra, Rb, Rc. The three windings may be connected in a star ("Y") configuration having a center tap CT, or in a delta configuration (not shown). Embodiments of the invention may be applied to either. For each coil, a pair of switches Xsa, Xga, Xsb, Xgb, Xsc, Xbc (collectively "switch(s) X") connect a free end of a coil (also referred to as a coil tap) at Va, Vb, Vc, to supply Vs and GND voltages, respectively. The switches are typically power transistors such as Mosfets or the like. A reverse biased diode Dsa, Dga, Dsb, Dgb, Dsc, Dgc (collectively "diode(s) D") is placed in parallel with (or may be inherently within) each of these switches. The diodes are power rectifiers, and typically serve to protect the switches and windings against induced voltages exceeding the supply or ground voltage. As described in more detail below, during PWM-off states, the voltage drop across the diodes D has been found to cause the center tap voltage $V_{CT}$ to deviate from zero which, in turn, creates undesirable variances in measurement of the back EMF voltage e.

Continuing to refer to FIG. 2, it will be described below, by way of example, how the diodes D deviate the center tap voltage CT from zero during a PWM-off state. For this example, it is presumed that the motor 20 is in its first phase of a six-phase commutation sequences, wherein current flows from winding A to winding B, while winding C is left floating. Further, it is presumed preferably that during the PWM-off state, the PWM signal does not turn on the switch Xga coupling winding A to ground. In this manner, during the PWM-off state, all of the current freewheeling from winding A to winding B passes through diode Dga. By not turning on, during the PWM-off state, the switch that couples the high winding (e.g. the winding "from" which current is flowing in a given commutation phase) to ground, there is reduced switching loss and noise introduced into the motor 20. It will be appreciated, however, that the present invention may be applied to motors which turn on the switch (e.g. Xga) coupling the high winding to ground during PWM-off periods, except that in such circumstances the precondition circuit 50 is appropriately adjusted to take into account the fact that all of the current during the freewheeling period is not passing through the diode (e.g. Dga) alone.

In view of the above assumptions, and by way of example, the following equations can be derived from FIG. 2:

If windings A and B are conducting current, winding C is floating and the terminal voltage Vc may be detected. When the transistor Xga is turned off, the current freewheels through the diode Dga. During this freewheeling period, and because there is no current in winding C, coil Lc induces a back EMF voltage $e_c$ measurable at coil tap Vc along with any other voltages present in winding C.

When summing the voltages around winding C; $v_c = e_c + v_n$. The induced signal $v_c$ at coil tap Vc equals the back EMF signal $_c$ only when $v_n$ equals zero (or $V_{CT}$ as shown in FIG. 2). In fact, $v_n$ is typically not zero because of an offset or distortion introduced by components of the motor driver.

For winding A, we have $$v_n = 0 - v_d - ri - L\frac{di}{dt} - e_a \quad (1)$$

For winding B, we have $$v_n = v_{mos} + ri + L\frac{di}{dt} - e_b \quad (2)$$

Where $v_d$ is the forward voltage drop of the diode Dga, $v_{mos}$ is the voltage drop on MOSFET Xgb, $v_n$ is the center tap voltage (Vct of FIG. 2), $r$ is the resistor R of the phase, L is the inductance of the winding, and e is the induced back EMF voltage (Bemf in FIG. 2) of the winding.

Adding equations (1) and (2), we get $$2v_n = v_{mos} - v_d - (e_a + e_b) \quad (3), \text{ and}$$

$$v_n = \frac{v_{mos} - v_d}{2} - \frac{e_a + e_b}{2} \quad (4)$$

Also from the balanced three-phase system, we have $$e_a + e_b + e_c = 0 \quad (5)$$

From (3) and (4), $$v_n = \frac{v_{mos} - v_d}{2} + \frac{e_c}{2} \quad (6)$$

So, the terminal voltage Vc, $$v_c = e_c + v_n = \frac{3}{2}e_c + \frac{v_{mos} - v_d}{2} \quad (7)$$

If we ignore the second term of (7), the induced signal $v_c$ at coil tap Vc is a function of the back EMF voltage $e_c$. However, especially at low speed and low voltage, the back EMF voltage $e_c$ is very small. Accordingly, one-half of the diode voltage of approximately 0.5 volts will significantly affect the induced signal $v_c$ for a system driving a 12-volt motor. Thus, the second term of equation (7) plays a significant role.

For a low voltage MOSFET, Rd is very low and its Vmos can be ignored, so (7) can be rewritten as, $$v_c = e_c + v_n = \frac{3}{2}e_c - \frac{v_d}{2} \quad (8)$$

The above equations demonstrate that the induced signal $v_c$ at the coil tap Vc is proportional to the back EMF $e_c$ of winding C with the exception of one-half of the voltage across the diode Dga, shown as voltage Vd in equation (8). As described below, an embodiment of the claimed invention provides a precondition circuit for compensating or offsetting the effect of diode Dga, or compensating for any other distortion in the induced signal $v_c$ at coil tap Vc.

Figure 3:
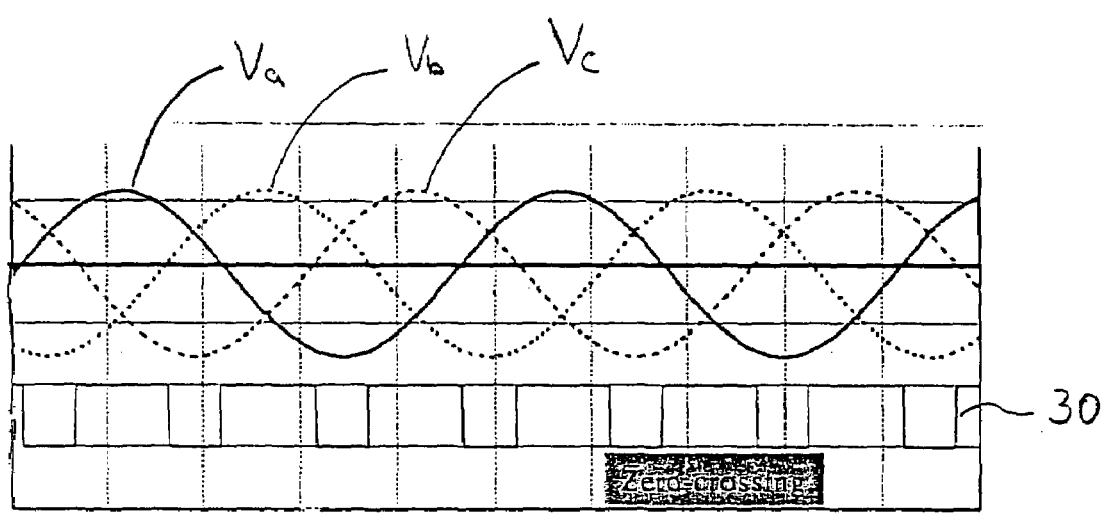
FIG. 3 is a theoretical timing diagram depicting the voltages and zero crossings detected in each of three phases of the circuit shown in FIG. 2 with the PWM signal removed.

FIG. 3 is a theoretical timing representation of the zero-crossing detection in a motor 20 that does not include the precondition circuitry 50. The graph of FIG. 3 shows theoretical data presuming, for sake of simplicity, the high-frequency PWM signal has been removed. Ideally, zero crossings of each phase A, B, C of the motor 20 would be distributed evenly in 60-degree intervals. However, the detection of the zero crossing for each phase is unsymmetrical due to the effect of the diodes D during the PWM-off states. More particularly, as shown in FIG. 3, each time the coil-tap voltage Va, Vb, Vc crosses zero, a zero-crossing signal 30 is shown to transition from high-to-low or low-to-high. Due to the effect of the diodes D as indicated by equation (8) above, the zero-crossing signal 30 does not transition in equal 60-degree intervals.

Referring briefly back to FIG. 2, in systems not having the precondition circuitry 50, the zero-crossing signal 30 was typically obtained by comparing the floating-phase coil-tap voltage, such as voltage Vc, with a reference voltage Rref by way of a comparator 35. While for sake of example only winding C is shown to be coupled to a comparator 35 for detecting zero crossings, it will be appreciated that each winding A, B, and C is coupled to a comparator for this purpose. In especially low-voltage and/or low-frequency applications, it has been determined that because the slope of change of the coil-tap voltage Va, Vb, and Vc as it approaches zero crossing is very gradual, accurately detecting the time a zero-crossing actually occurs can be difficult. In particular, with a gradual change in coil-tap voltage around zero crossing, the actual timing of the zero crossing is often difficult to determine in view of the inherent standard deviation/offset of the comparator 35.

FIG. 4A illustrates a driver circuit for a brushless DC motor 100, according to an embodiment of the present invention. The motor 100 is substantially similar to the motor 20 described above with reference FIG. 2 and, therefore, common elements will not again be discussed. However, in addition to the elements described above, the motor 100 includes a precondition circuit 50 that includes networks 50a, 50b, and 50c, coupled respectively to the coil taps Va, Vb, and Vc for each winding. As described in detail below, the precondition circuit 50 includes circuitry for offsetting or compensating the coil-tap voltage Va, Vb, and Vc from the effect of the diodes D. An output of the precondition circuit 50 is coupled to a zero-crossing detection circuit 52. The zero-crossing detection circuit 52 may, for example, take the form of the comparator 35 described above with reference to FIG. 2 or other known circuits known in the art for detecting zero crossings.

Figure 4:
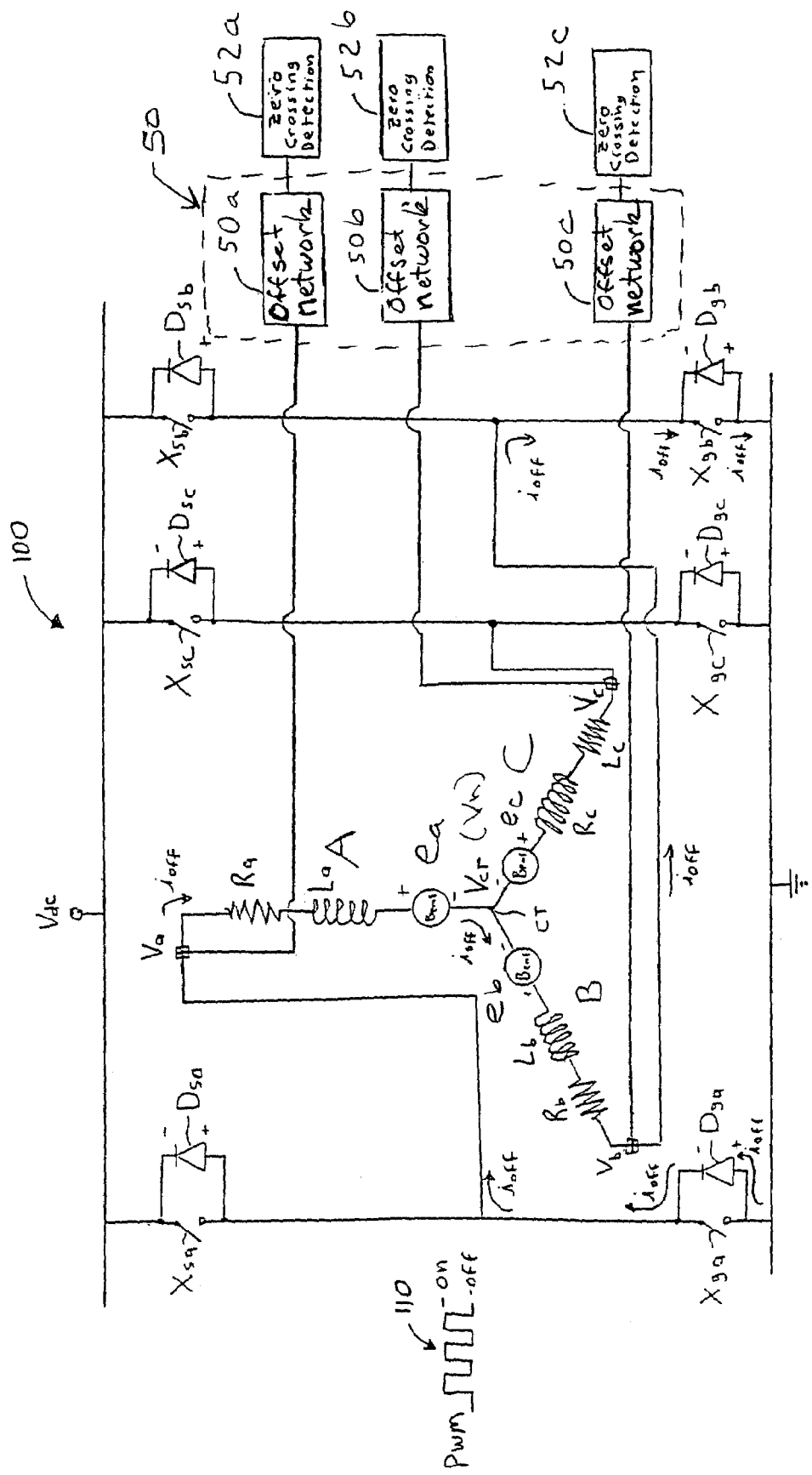
FIG. 4 illustrates a driver circuit for a brushless DC motor according to an embodiment of the present invention.
Figure 5:
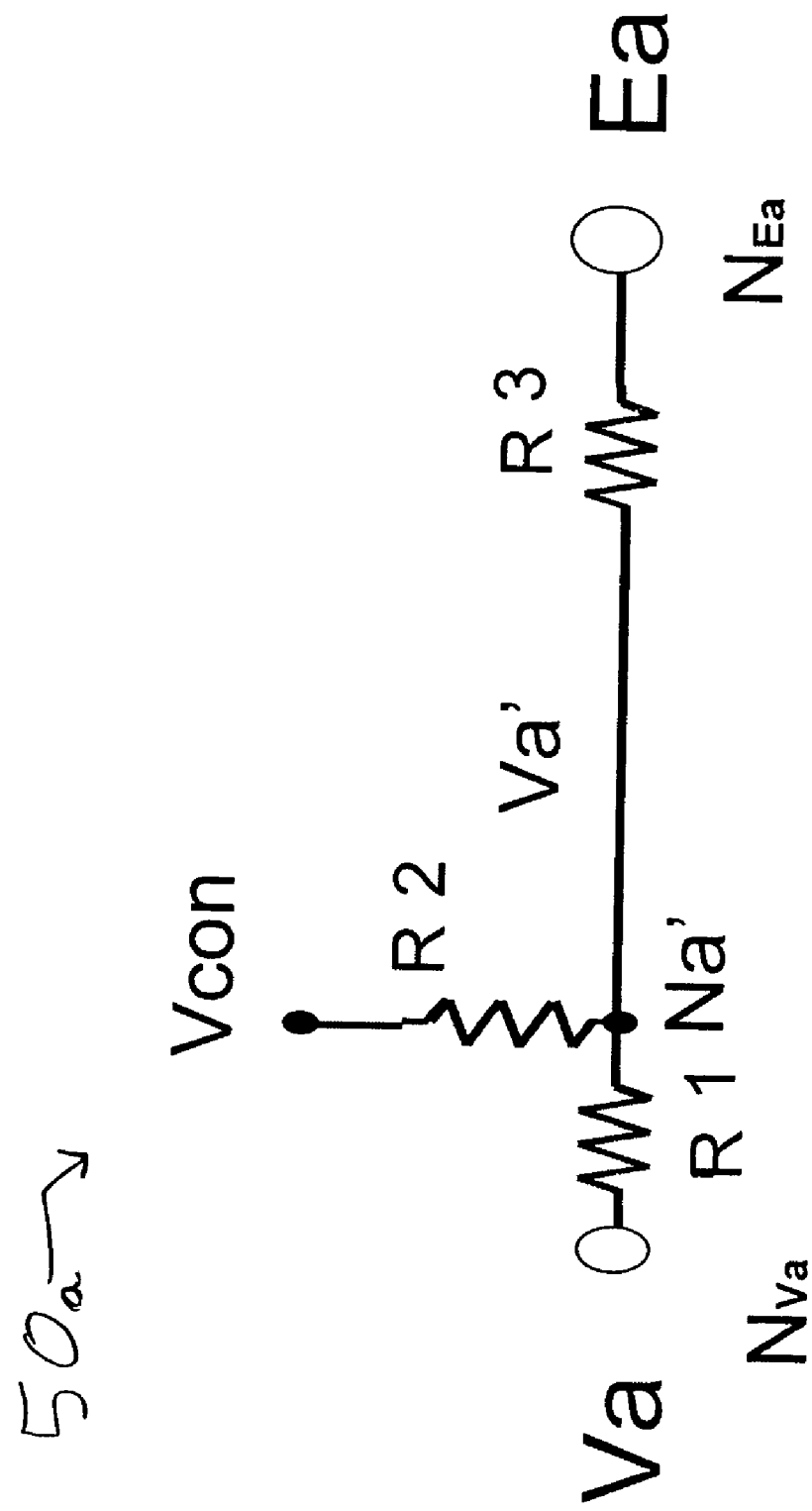
FIG. 5 is a schematic diagram of a precondition circuit for winding A of the motor illustrated in FIG. 4, according to an embodiment of the present invention.

FIG. 5 is a schematic diagram of a network 50a for winding A illustrated in FIG. 4, according to an embodiment of the present invention. However, it will be appreciated that similar networks 50b and 50c are coupled to windings B and C as shown in FIG. 4. The networks 50a–c of the present embodiment includes circuitry for offsetting the voltage offset of the diode D from the induced signal v so that the outputted back EMF signal Ea is substantially directly proportional to the back EMF voltage e. As used herein, "back EMF signal" means a signal related to the back EMF voltage e, particularly with respect to the zero crossing feature. For example, as shown in equation (9) below, the "back EMF signal" Ea may be 3/2 of the back EMF voltage e.

The network 50a includes a node Nva for receiving an induced signal Va, a node for outputting the back EMF signal Ea, a control voltage Vcon, and resistors R1, R2, and R3. Resistor R1 is coupled between the node Nva and a node Na', the resistor R2 is coupled between the control voltage Vcon and the node Na', and the resistor R3 is coupled between the node Na' and the node NEa. The voltage Vcon and the resistors R1 and R2 are selected to compensate for the offset voltage Vd/2 that is introduced into the induced signal Va by the diode D such that Vcon×R1/(R1+R2)=Vd/2.

Specifically, for winding A:

$$Ea = Va' = Va + Vcon*R1(R1+R2) \quad (9)$$

Also from equation (8)

$$Va = \frac{3}{2}e_a - \frac{v_d}{2} \quad (10)$$

If we select Vcon, R1, and R2 such that $$Vcon * \frac{R1}{R1+R2} = \frac{Vd}{2} \quad (11)$$

Then, combining equations (9) and (10) results in $$Va = \frac{3}{2}e_a - \frac{v_d}{2} + \frac{v_d}{2} = \frac{3}{2}e_a \quad (12)$$

As demonstrated by the above equations, the back EMF signal Ea is directly proportional to the back EMF voltage $e_a$ when negligible current flows through R3, which is a current limiting resistor. In a driver controlling a 12-volt motor, typical values may be 1 k ohms for R1, 10 k ohms for R2, 4.7 k ohms for R3, and 5 volts for Vcon.

Figure 6:
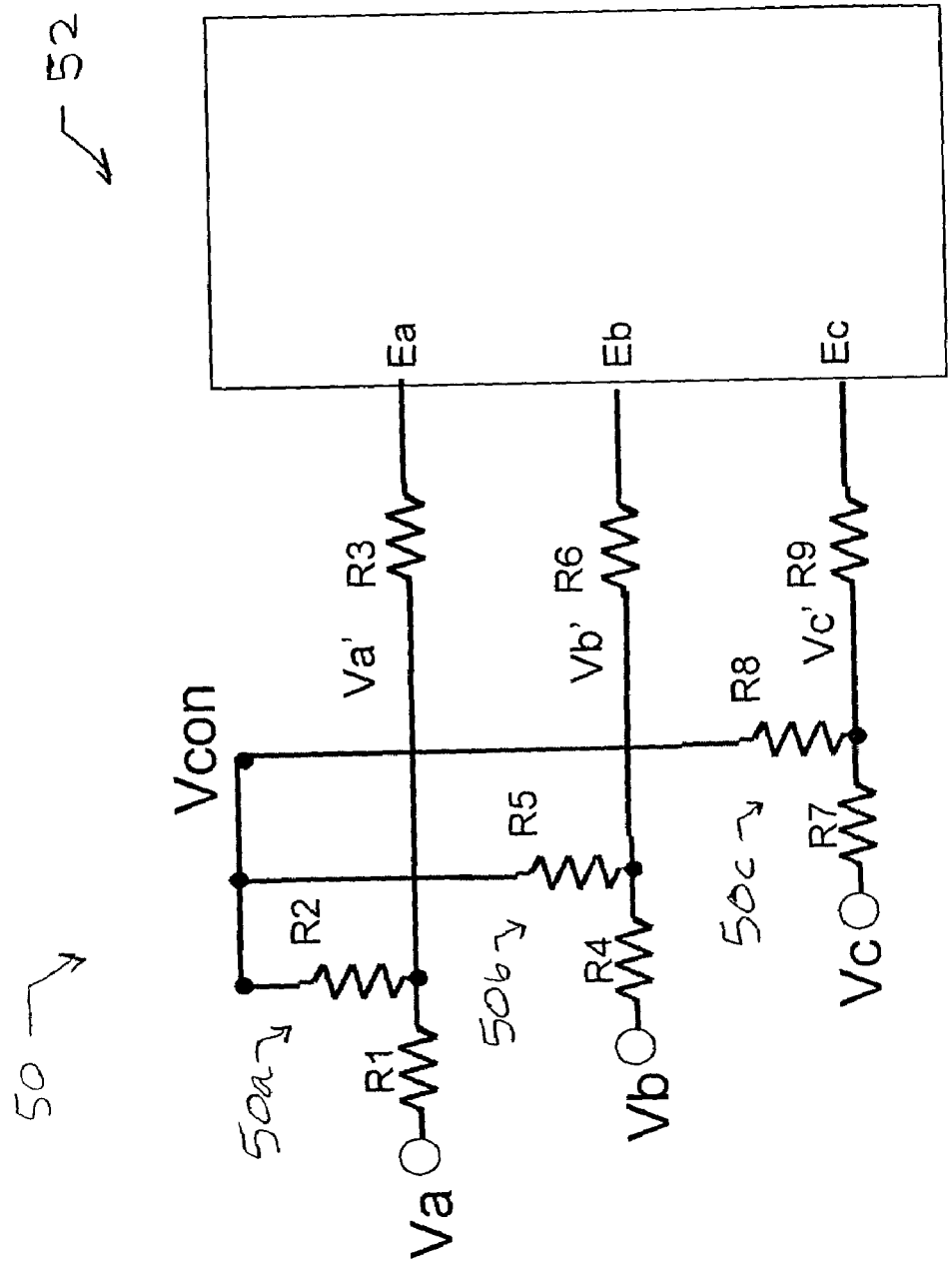
FIG. 6 is a schematic timing of a precondition circuit and the zero-crossing detector 52 arranged for compensating the induced signals Va, Vb, and Vc from the three windings of the motor illustrated in FIG. 4, according to an embodiment of the present invention.

FIG. 6 is a schematic diagram of the precondition circuit 50 including networks 50a–c, and the zero-crossing detector 52, arranged for compensating the induced signals Va, Vb, and Vc for the three windings A, B, and C of the motor 100 of FIG. 4, according to an embodiment of the present invention. The precondition circuit 50 is an extension of the network 50a of FIG. 5, where three resistive networks are provided to compensate the three induced voltages Va, Vb, and Vc. Alternatively, each network may receive a different voltage Vcon, and/or include different resistor values. In one embodiment, R1=R4=R7, R2=R5=R8, and R3=R6=R9.

Continuing to refer to FIGS. 4 and 5, and using winding A as an example, in order to offset the effect from the diode Dga on the signal Va at the coil tap Va, the network 50a includes a voltage-divider circuit. Node Nva is coupled to the coil tap Va to receive the induced voltage Va. Node NEa is coupled to an input of the zero-crossing detector 52. The resistive network of R1 and R2, and Vcon offsets the induced voltage Va of the winding A coil tap Va by Vd/2, providing the induced signal Va' at node Na' and signal Ea at node NEa that are directly proportional to the back EMF voltage e of winding A. In this manner, the network 50a is able to add a constant voltage to the induced signal Va that substantially eliminates the effect of the diode D.

It will be appreciated that while values for Vcon, R1 and R2 are stated above for sake of example, other values could have been chosen to achieve a similar result. Further, it will be appreciated that while the networks 50a–c are shown to be formed of a voltage-divide circuit, the present invention is intended to cover any circuit configuration active or passive which serves to offset the value of the diode D or any other distortion, and is not limited to a voltage-divide circuit. Additionally, as mentioned above, in the present example during a PWM-off state, the switch Xga in the high winding is not turned on in order to minimize switching loss and noise. Thus, in the example leading to equation (9) the effect of the diode Dga was shown to be VDga/2. It will be appreciated, however, that the present invention is suitable for use in other motor configurations where, for example, the ground switch (e.g. Xga) for the high winding is turned on during a PWM-off state. In such cases, the effect of the diode D on the coil-tap voltage will differ from the VDga/2 described in the above example. Accordingly, in such alternative embodiments, components of the precondition circuit 50 are correspondingly adjusted to offset the effect of the "on" ground switch Xga by an appropriate amount as can be readily determined by one in the art.

The operation of the precondition circuit 50 and the networks 50a–c are now described with reference to FIGS. 4–6 according to an embodiment of the invention. The motor 100 is driven by a PWM signal 110 that is applied to the motor 100 in one of several conventional manners. For example, in one embodiment, during PWM-on states, the high switch (e.g. Xsa, Xsb, Xsc) for the "from" winding of the commutation sequence and the ground switch (e.g. Xga, Xgb, Xgc) for the "to" winding of the commutation sequence are turned on. During the following PWM-off state, the high switch in the "from" winding is turned off and all of the freewheeling current is allowed to pass through the diode (e.g. Dga, Dgb, Dgc) in the "from" winding to ground through the ground switch in the "to" winding. Such a current path during the PWM-off state is representatively depicted in FIG. 4 by current path $i_{off}$. By not turning on the ground switch in the "from" winding during the PWM-off state, it is possible to avoid switching delays and noise. However, it will be appreciated that the present invention is suitable for motors 100 that operate in any switching mode.

The motor 100 advantageously monitors for zero-crossing detections during PWM-off states. Because a PWM signal typically oscillates at a frequency significantly greater than the frequency at which the commutation sequence advances, zero crossings which may happen to occur during a PWM-on state are still detectable during the PWM-off state with minimal delay. For example, the frequency of the PWM signal may be in the range of 20 kHz–100 kHz while the frequency at which the commutation sequence advances is typically on the order of 100 Hz. Further, by performing zero-crossing detection during PWM-off states, filters and delays associated with offsetting the center tap voltage CT during PWM-on states are avoided.

During PWM-off states, zero-crossing detection occurs by providing the induced signal from coil taps Va, Vb, and Vc for the floating phase to nodes Nva, Nvb, and Nvc, respectively, of the precondition circuit 50. The networks 50a–c of precondition circuit 50 then offset the induced signal for the effect of the diode D and the resulting signals Ea, Eb, Ec are proportional to the back EMF voltage e for each winding. For instance, in the present example, the precondition circuit 50 adjusts the induced signal at the floating phase coil taps Va, Vb, and Vc by an amount substantially equal to an amount by which the voltage at the center tap Vn (also shown as $V_{CT}$) is deviated from zero as discussed above with reference to equations (6) & (7).

Following the offset of the precondition circuit 50, the output of the precondition circuit is provided to the zero-crossing detection circuit 52. The zero-crossing detection circuit 52 may, for example, include a comparator for comparing the output of the precondition circuitry with a reference voltage to determine when a zero crossing has occurred. As the precondition circuit 50 has adjusted the induced signal for variations introduced by the diode D, the resulting compensated signal E is closely proportional to the back EMF voltage e.

Figure 7:
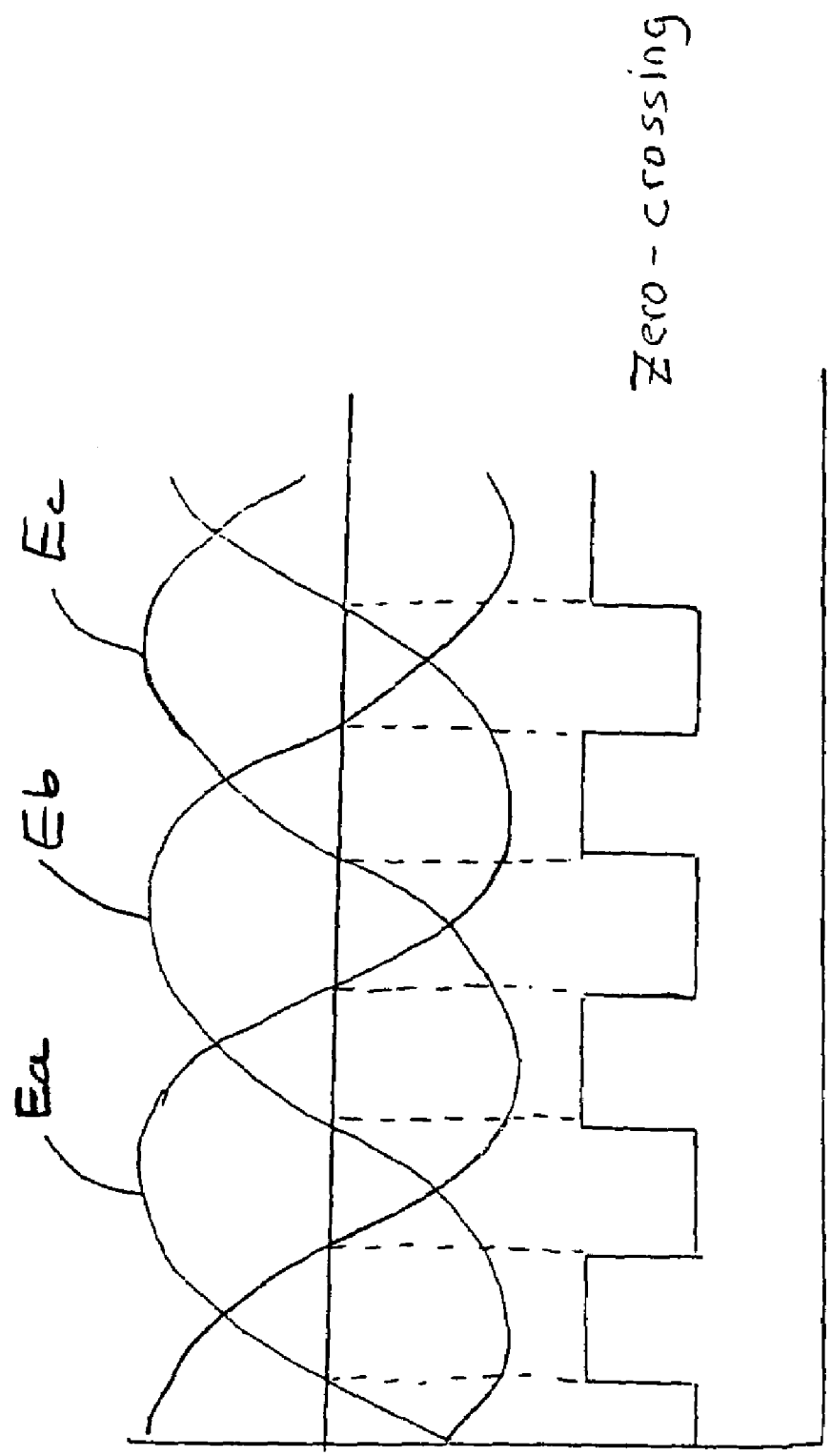
FIG. 7 is a theoretical graph illustrating the compensated signals Ea, Eb, Ec of precondition circuit of FIG. 6, and resulting output from the zero-crossing detection circuit, according to an embodiment of the invention

FIG. 7 is a theoretical timing diagram illustrating the compensated signals Ea, Eb, Ec at the nodes Neb, and Nec of precondition circuit 50 of FIG. 6, and resulting output from the zero-crossing detection circuit 52 in a motor, according to an embodiment of the invention. For sake of simplicity, the theoretical data shown in FIG. 7 presumes the high frequency PWM signal is removed. As shown, with the precondition circuit 50 compensating for the offset caused by the diode D, the output of the zero-crossing detection circuit 52 that controls advancement of the commutation sequence of the motor is substantially reflects the desired 60-degree switching intervals. Accordingly, an aspect of the present invention provides for smoother switching through the commutation sequence, which in turn provides a more efficient motor that is less likely to jitter or stall.

Although the invention has been shown and described with respect to certain preferred embodiments, it is obvious that equivalents and modifications will occur to others skilled in the art upon the reading and understanding of the specification. Alternatively, while the networks 50a–c of the precondition circuit 50 and zero-crossing detection circuits 52 are depicted as separate components for each phase, it will be appreciated that such circuitry may be combined into fewer circuits and/or fully consolidated without departing from true spirit or scope of invention. Therefore, embodiments of the present invention include all such equivalents and modifications.

What is claimed is:

1. A circuit for providing a back EMF signal that represents a back EMF voltage induced in an electrically floating coil of a brushless DC motor, the circuit comprising:
   an input node operable to receive a tap voltage from the floating coil; and
   an electrical network coupled to the input node and operable to generate the back EMF signal by removing from the tap voltage a predetermined offset voltage that is of a same order of magnitude as the back EMF voltage.

2. A circuit for providing a back EMF signal that represents a back EMF voltage induced in a coil of a brushless motor, the circuit comprising:
   an input node operable to receive a tap voltage from the coil;
   a network coupled to the input node and operable to generate the back EMF signal by removing a predetermined offset voltage from the tap voltage;
   wherein the network includes:
   an output node operable to carry the back EMF signal;
   a control node operable to receive a control voltage Vcon;
   an intermediate node;
   a first resistor R1 coupled between the intermediate node and the input node;
   a second resistor R2 coupled between the intermediate node and the control node; and
   a third resistor R3 coupled between the intermediate node and the output node.

3. The circuit of claim 2, wherein $V_{con} \times (R1/(R1+R2)) =$ (offset voltage)/2.

4. The circuit of claim 1, wherein the offset voltage includes a voltage drop induced by a driver of the motor.

5. The circuit of claim 4, wherein the voltage drop is across a diode of the driver.

6. The circuit of claim 1, wherein the back EMF signal has a zero crossing that substantially coincides with a zero crossing of the back EMF voltage.

7. The circuit of claim 1, wherein the offset voltage is generated by a current that flows through another coil of the motor.

8. A driver circuit for a sensorless brushless DC motor having a plurality of coils each inducing a respective back EMF voltage while electrically floating, the driver comprising:
   a plurality of input nodes each operable to receive a tap voltage from a respective floating coil;
   a plurality of electrical networks each coupled to a respective input node and operable to generate a respective back EMF signal by removing from the corresponding tap voltage a predetermined offset voltage that equals or approximately equals the respective back EMF voltage; and
   a zero-crossing detector operable to receive the back EMF signals and determine there-from when zero crossings of the respective back EMF voltages occur.

9. The driver of claim 8, wherein the motor is operable in a pulse width modulation (PWM) mode having a PWM-on state and a PWM-off state.

10. The driver of claim 8, wherein each network is further operable to generate the respective back EMF signal during a PWM-off state when the respective coil is floating.

11. A sensorless brushless motor assembly, comprising:
   a sensorless brushless motor having a plurality of coils each generating a back EMF voltage during a respective floating period; and
   a motor driver circuit including
   a plurality of input nodes each operable to receive a tap voltage from a respective one of the floating coils;
   a plurality of electrical networks each coupled to a respective one of the input nodes and operable to generate a respective back EMF signal by removing from the corresponding tap voltage a predetermined offset voltage that is of a same order of magnitude as the respective back EMF voltage; and
   a zero-crossing detector operable to receive the back EMF signals and to determine when the zero crossings of the back EMF voltages occur.

12. The motor assembly of claim 11, wherein the driver circuit further includes a controller operable to commutate the motor in response to the detected zero crossing.

13. The motor assembly of claim 11, wherein the motor is operable in a pulse width modulation (PWM) mode having a PWM-on state and a PWM-off state.

14. The motor assembly of claim 13, wherein each network is further operable to generate the back EMF signal during respective PWM-off states.

15. The motor assembly of claim 11, wherein each coil has one end coupled to a center tap and the tap voltage is provided proximate to another end of the coil.

16. A method of providing a back EMF signal that represents a back EMF voltage induced in an electrically floating coil of a brushless motor, comprising:

receiving a tap voltage from the floating coil; and generating the back EMF signal equal to the tap voltage minus a predetermined offset voltage that is of a same order of magnitude as the back EMF voltage.

17. A method for advancing a sensorless brushless motor having a plurality of coils, comprising:

receiving a tap voltage from one of the coils while the coil is floating;

removing a predetermined offset voltage from the tap voltage to generate a back EMF signal that represents a back EMF voltage induced in the floating coil the predetermined offset voltage and the back EMF voltage being of a same order of magnitude;

detecting a zero crossing of the back EMF voltage from the back EMF signal; and advancing the motor a step in a commutation sequence in response to detection of the zero crossing.

18. The method of claim 17, further comprising repeating the steps for a tap voltage from another coil.

19. A circuit for providing a back EMF signal that represents a back EMF voltage induced in an electrically floating coil of a brushless motor, the circuit comprising:

means for receiving a tap voltage from the coil; and means for generating the back EMF signal by removing a predetermined offset voltage from the tap voltage, the predetermined offset voltage and the back EMF voltage being of a same order of magnitude.

* * * * *